June 10, 1924.
C. H. HAPGOOD
Re. 15,857
SCALE
Original Filed Oct. 6, 1913 2 Sheets-Sheet 1
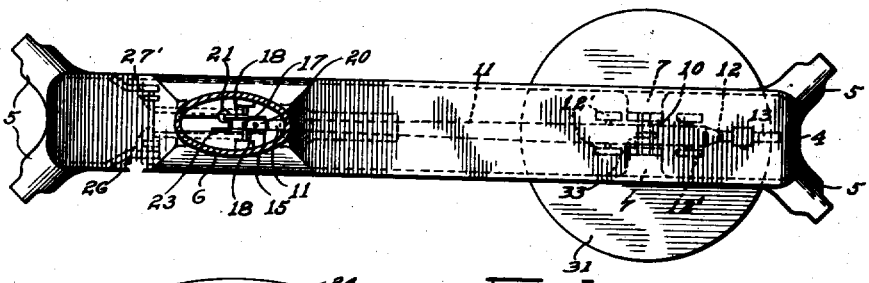
Fig. I.
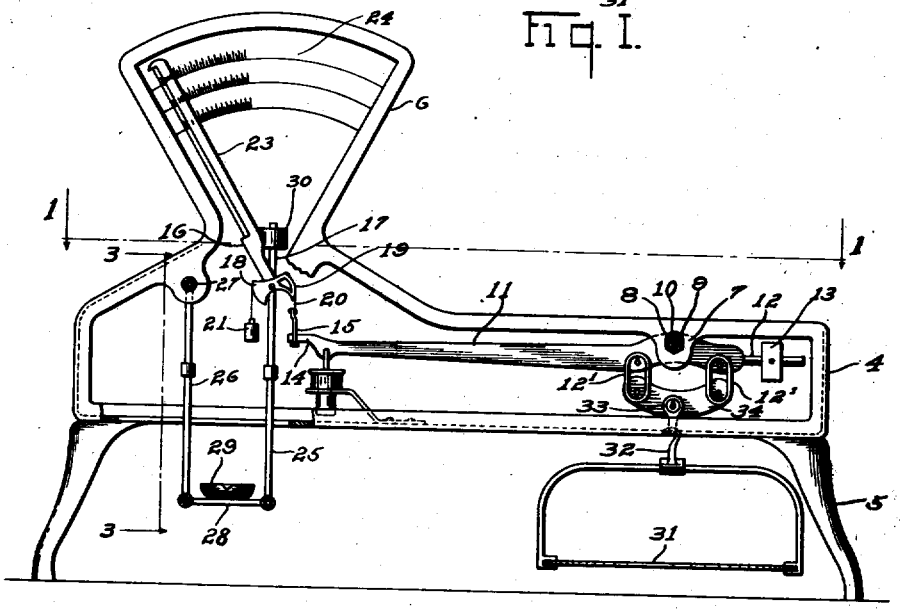
Fig. II.
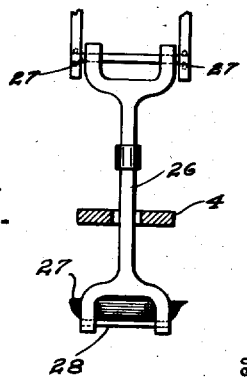
Fig. III.
Inventor
CLARENCE H. HAPGOOD.
By C. Marshall
Attorney June 10, 1924.
C. H. HAPGOOD
Re. 15,857
SCALE
Original Filed Oct. 6, 1913 2 Sheets-Sheet 2
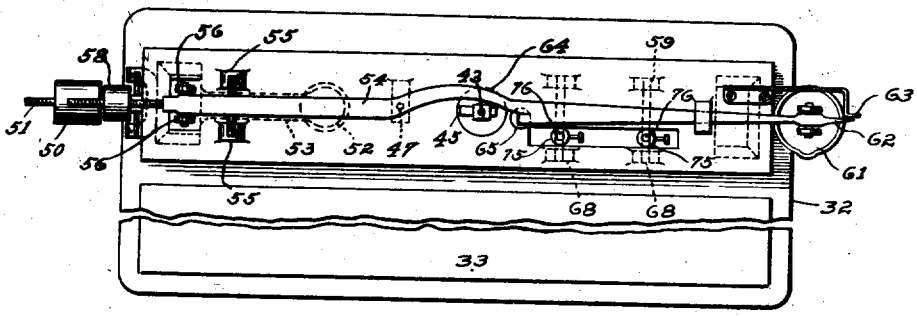
Fig. V.
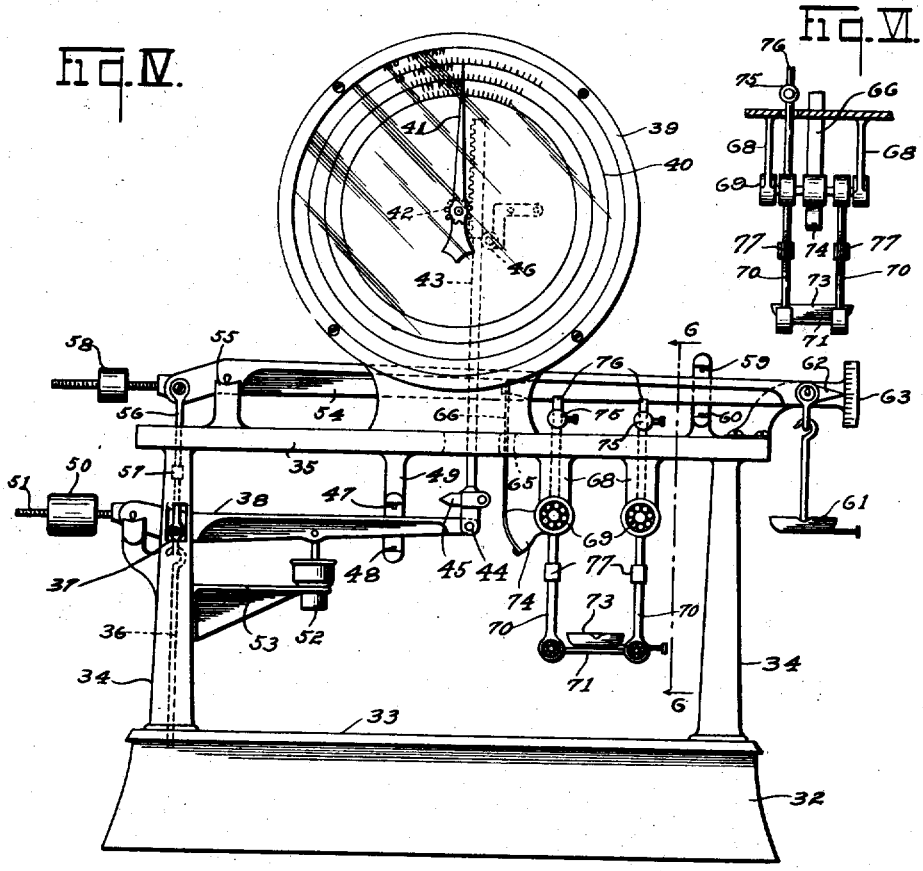
Fig. VI.
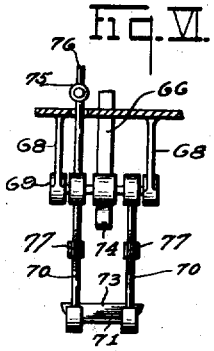
Fig. IV.
Inventor
CLARENCE H. HAPGOOD
By C. O. Marshall
Attorney Reissued June 10, 1924. Re. 15,857

UNITED STATES PATENT OFFICE.

CLARENCE H. HAPGOOD, OF TOLEDO, OHIO, ASSIGNOR TO TOLEDO SCALE COMPANY, OF JERSEY CITY, NEW JERSEY, A CORPORATION OF NEW JERSEY.

SCALE.

Original No. 1,229,449, dated June 12, 1917, Serial No. 793,661, filed October 6, 1913. Application for reissue filed June 3, 1921. Serial No. 474,768.

*To all whom it may concern:*

Be it known that I, CLARENCE H. HAPGOOD, a citizen of the United States, residing at Toledo, county of Lucas, and State of Ohio, am the inventor of certain new and useful Improvements in Scales, of which the following is a specification.

My invention relates more particularly to a scale designed for automatically counting the numbers of a group or mass of articles each having substantially the same weight. Thus, in hardware stores, stock rooms of factories and the like where screws or bolts are to be dispensed in different numbers, and in fact in all places and situations where it is frequently necessary to count a definite number of small articles from time to time or to determine the numbers of such articles in groups or quantities of the same, my invention will be found of value. But though my invention is in some of its features adapted for use only in connection with counting scales, other of its features are of more general application and not so limited. For the sake of exemplification of my invention, however, I have illustrated and described two preferred forms thereof in the nature of counting scales, it being understood that my invention is not limited to these particular forms but is set forth in the following claims, in which I have endeavored to distinguish it from prior inventions in the art so far as known to me without, however, relinquishing or abandoning any portion of the invention.

Referring now to the accompanying drawing, Figure 1 is a plan of a preferred form of scale partly in section on the line 1—1 of Figure 2;

Figure 2 is a front elevation partially broken away and with the face plate of the scale removed in order to more clearly show the invention;

Figure 3 is a vertical section upon the line 3—3 of Figure 2 looking in the direction of the arrows;

Figure 4 is a side elevation of a second form of the invention;

Figure 5 is a plan of the same partly broken away, and with the weight indicator casing removed; and Figure 6 is a section upon the line 6—6 of Figure 4 looking in the direction of the arrow.

The same numeral of reference is applied to each part wherever it occurs throughout the specification.

The invention as disclosed in either modification may be generally described as a beam and pendulum scale in which the pendulum is weighted with a specimen or sample of the articles to be counted and the latter placed in the scale pan, the displacement of the pendulum being proportional to the number of articles in the pan and indicated by an indicator and chart.

Turning now to Figures 1 and 3 inclusive, and to the scale shown therein, the frame 4 may be of any suitable character and in the present instance is shown as comprising a chambered casting having legs 5 and an upward extension 6, the latter constituting a housing for the chart. The casing is formed at 7 with ears depending from the upper wall thereof and perforated at 8 to form bearings 9 for the knife edges 10 of the scale beam 11. The bearings 9 may take the form of agates seated in the casing, or the casting may simply be hardened at this point if desired. The beam 11 carries the knife 10 by which it is supported in its bearings and on the shorter end with an extended rod 12 upon which a counterweight 13 is adjustable for the purpose of sealing the scale. At the end of its longer arm 14 the lever is provided with a bearing which receives a stirrup 15 depending from the counterbalancing member in a manner which will be presently described.

The counterbalancing member is formed with an arbor 16 which carries a concentric segment 18 and an eccentric segment 19, from the latter of which the stirrup 15, heretofore mentioned, is suspended by a flexible band 20. The concentric segment 18 suspends a counterweight 21 which counterbalances the weight of the stirrup 15. Upon the same casting and rigid therewith is mounted a pointer 23 which travels over a chart 24 containing a series of rows of weight indications of suitable character depending upon the counting for which the scale is designed. The pendulum rod or arm 25 is likewise rigidly attached to the pivoted casting and suspended therefrom, a similar arm 26 being pivotally suspended from a fixed bearing 27 and connected to the other rod 25 by a platform 28 which is capable of receiving a receptacle 29 or a sample of one of the articles to be weighed. A weight 30 on a rod 17 exactly counterbalances the turning movement or strain due to the pendulum system just described, including the pan 29 if the same is used. The scale pan 31 is not, as ordinarily, directly suspended from or carried by the scale beam, but is connected by means of a hook 32 and loop 33 with a yoke 34 which in turn is suspended from the beam, being connected thereto at opposite sides of its fulcrum by a pair of links 12′, 12′. By means of this yoke construction the scale pan may be suspended from the beam effectively at a point as near as desired to the plane of the fulcrum of the lever without in any manner interfering with the operation thereof and thus the ratio of the length of the short arm of the lever (i. e., the distance between the fulcrum and the point of attachment of the scale pan measured lengthwise of the lever) to the length of the long arm of the lever may be made as small as desired and the capacity of the scale correspondingly large without inconveniently extending said long arm. In this particular form of scale the lever is of the second order, that is to say, the scale is suspended from the same side of the fulcrum of the lever as that to which the counterbalancing device is attached, but obviously, the lever might be of another order. The sustaining or load offsetting means in this case is the pivoted member comprising the pendulum system and since the latter is accurately counterbalanced the resistance to depression of the beam must depend upon the weight placed upon the platform or cross member 28. The ratio between the two arms of the lever is so chosen and the scale otherwise so constructed that if a single specimen of the articles to be counted be placed upon the platform 28 or within the pan 29 and another upon the scale pan the indicator hand will be moved one division of the chart, if two articles be placed upon the pan the hand will move two divisions, and so on.

In use the bulk or mass of articles to be counted is placed upon the scale pan 31, which, of course, proportionately displaces the pendulum carrying the samples until equilibrium is attained, when the indicating hand 23 indicates upon the inner arc of the chart the number of articles in the mass. Or, if ten of the articles to be counted be placed in the pan 29 the number of articles upon the pan 31 will be indicated by the intermediate row of indications upon the chart opposite the number "10" on the hand, it being understood that the indications of this intermediate row are multiples of 10 respectively of the indications in the row opposite the numeral "1" on the hand. So also if 100 of the articles to be counted be dropped in the pan 29 the number of articles in the mass on the pan 31 is to be read in the uppermost arc or row of indications opposite the numeral 100 on the hand and which are multiples of 100 of the indications upon the lowermost row or arc or row of indications.

In the second form of the invention shown in Figures 4 to 6 inclusive, it is applied to a platform scale. The base 32 contains the usual base levers supporting the scale platform 33 and has mounted thereon the pillars 34, 34, supporting the cross piece or shelf 35. The usual link 36 connects the base levers with a loop 37 upon a lever 38 by which the indicator mechanism 39 is operated. For this purpose the indicator mechanism consists of a dial 40 having a plurality of rows of indications bearing the relation to each other of the rows of indications on the dial of the scale first described and an indicator hand 41 co-operating therewith. The journal of the latter is provided with a pinion 42 with which a rack 43 pivoted at 44 to the lever 38 meshes, a weight 45 and anti-friction rollers 46 serving to keep the rack in mesh with the pinion. Lever 38 is limited in its movements by stops 47, 48 upon a bracket 49 depending from the shelf, and a poise 50 adjustable upon a screw 51 serves for adjusting the lever to exact equilibrium. A dashpot 52 upon a bracket 53 acts in the usual manner to prevent unnecessary movement of the lever 38. The beam proper of the scale is shown at 54 as fulcrumed upon bolts 55 and connected to lever 38 by a link 56 having a suitable adjustment 57. The lever 54 is also provided with a sealing poise 58 at its short end and with stops 59, 60, upon the bracket rising from the shelf 35 to limit the up and down movement of said beam. At its outer or longer end the beam supports a specimen pan 61 and is formed with a pointer 62 co-operating with a graduated arc 63. The specimen pan 61 may be used for counting articles in a manner to be presently described. Lever 54 is offset at 64 and formed with a shoulder 65 to which is secured a steel ribbon 66 for connection to the pendulum load offsetting means to be now described. A pair of brackets 68, 68 projects downwardly from the shelf 35, and each is formed at its lower end with a raceway 69, 69 for the balls of a ball bearing. A pair of links 70, 70 are supported respectively at their upper ends in these ball bearings and are connected at their lower end by a link 71 which is pivoted at its opposite ends thereto and supports a specimen pan 73 or other receptacle for one or more of the articles to be counted. A segment 74 is rigidly attached to one of the pendulum links 70 and is engaged by the strap 66.

The pendulum links 70 are nicely counterbalanced by adjustable weights 75, 75 upon rods 76, 76, extending upwardly therefrom. In order that the effective length of the pendulum links 70 may be adjusted, the links are each made in two screw-threaded sections connected by turn buckles 77.

The multiplication of the lever mechanism is such that one article placed in the specimen pan 61 will counterbalance a definite number of articles (preferably 100) on the platform 33. If, therefore, it is desired to count out one hundred articles, one article is placed in the specimen pan and enough articles are then poured upon the platform 33 to bring the indicator hand 41 to zero position and the pointer 62 into registration with the center graduation on the chart 63. When the indicator hand is in zero position the articles on the platform are exactly counterbalanced by the article in the specimen pan 61. If it is desired to count out five hundred articles, five articles are placed in the specimen pan 61 and enough of the articles are then placed upon the platform to bring the indicator hand to zero position. The specimen pan 61 may thus be used to count out even hundreds of articles.

From what has been said with reference to the first described form of the invention, it is believed that the operation of the scale when one or more specimens are placed in the pan 73 will be readily understood. The leverage is such and the scale is so arranged that if one of the articles to be counted is placed upon the pan 73 and a quantity of articles is placed upon the platform 33 the indicator hand will be moved over a number of graduations in the first circle upon the dial to indicate the number of articles in the quantity upon the platform 33, or, if ten articles be placed in the pan 73, the number of articles upon the platform may be read in the second circle, and so on.

If the quantity of articles to be counted is so great as to be beyond the capacity of the chart, enough specimens of the article may be placed in the specimen pan 61 to so nearly counterbalance the load upon the platform 33 that the mechanism may be floated by placing one, ten or one hundred specimens in the pan 73. When one or more specimens are thus placed in the pan 73, the number indicated upon the dial as counterbalanced by the specimens in the pan 73 may be added to the even hundreds counterbalanced by the specimen pan 61, By the use of the non-shiftable specimen pan 61 and the variable leverage specimen pan 73 the capacity of the scale is made very great without impairing its sensitiveness or accuracy in counting small quantities.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a counting scale, in combination a pivoted beam, a pan connected thereto, a pendulum comprising a pair of supporting rods, a connection between the lower end of said rods adapted to support a sample of the articles to be counted, and a connection from one of said rods to the beam.

2. A counting scale comprising in combination a beam, a scale pan supported by the beam, a pair of pendulum rods or links independently pivoted, a cross member connecting the rods or links and adapted to support a sample of the articles to be counted, a segment rigidly connected to one of the rods, and a strap connecting the segment and the lever.

3. In a weighing scale and in combination with the beam thereof, a pendulum having a pair of side rods adjustable in length and a connecting member pivoted to the side rods, and a connection from the beam to one of said side rods.

4. In a weighing scale and in combination with the beam thereof, a pendulum having a rod pivoted intermediate its ends, a rod spaced from the first-mentioned rod, a member connecting said rods on one side of the pivot, the first-mentioned rod being provided with counterbalancing means on the other side of its pivot, and a connection from one of said rods to the beam.

5. In a counting scale, in combination a fulcrumed beam, a pan suspended from the beam and connected thereto on opposite sides of the fulcrum, a pendulum comprising a pair of pivoted rods, a platform pivotally connected to said rods and adapted to support a sample of the articles to be counted, and a connection from the beam to one of the rods.

6. In a counting scale, in combination, a fulcrumed beam, a pan suspended from the beam and connected thereto on opposite sides of the fulcrum, a pendulum comprising a pair of rods, a platform pivotally connected thereto and adapted to support a sample of the articles to be counted, means whereby the effective length of the rods of said pendulum may be adjusted, and a connection from the beam to one of said rods.

7. In a counting scale, in combination a fulcrumed beam, a pan suspended from the beam and connected thereto on opposite sides of the fulcrum, a pendulum comprising a pair of pivoted rods, a platform pivotally connected to said rods and adapted to support a sample of the articles to be counted, a segment secured to one of said rods at its pivot, and connections between the segment and the beam.

8. In a counting scale, in combination, lever mechanism, a commodity-receiver connected thereto, a non-shiftable specimen pan connected to said lever mechanism in opposition to said commodity-receiver, said specimen pan having a greater leverage than said commodity receiver whereby a single article in said specimen pan will counterbalance a definite plurality of articles in said commodity-receiver, and a shiftable specimen pan connected to said lever mechanism, whereby a specimen placed in said shiftable specimen pan will offset variable numbers of articles on said commodity-receiver.

CLARENCE H. HAPGOOD.

Witnesses:

HARRY ERNSBERGER,

FRANCES DOYLE.